US 7,856,530 B1

(12) United States Patent
Mu (10) Patent No.: US 7,856,530 B1
(45) Date of Patent: Dec. 21, 2010

(54) SYSTEM AND METHOD FOR IMPLEMENTING A DYNAMIC CACHE FOR A DATA STORAGE SYSTEM

(75) Inventor: Paul Yuedong Mu, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 527 days.

(21) Appl. No.: 11/981,663

(22) Filed: Oct. 31, 2007

(51) Int. Cl.
  *G06F 12/00* (2006.01)
(52) U.S. Cl. ...................... 711/119; 711/163
(58) Field of Classification Search .......... 711/119, 711/145, 167
  See application file for complete search history.

(56) References Cited

U.S. PATENT DOCUMENTS

| 5,546,211 | A | * | 8/1996 | Devon .......................... 398/98 |
| 5,568,629 | A | | 10/1996 | Gentry et al. |
| 5,889,934 | A | | 3/1999 | Peterson |
| 5,991,775 | A | | 11/1999 | Beardsley et al. |
| 6,636,946 | B2 | * | 10/2003 | Jeddeloh .................... 711/138 |
| 7,127,577 | B2 | | 10/2006 | Koning et al. |
| 7,237,021 | B2 | | 6/2007 | Penny et al. |
| 7,496,715 | B1 | * | 2/2009 | Vartti et al. ................. 711/144 |
| 7,552,282 | B1 | * | 6/2009 | Bermingham et al. ....... 711/119 |
| 2004/0148473 | A1 | * | 7/2004 | Hughes et al. ............... 711/144 |
| 2005/0172082 | A1 | * | 8/2005 | Liu et al. ..................... 711/144 |
| 2005/0210278 | A1 | * | 9/2005 | Conklin et al. .............. 713/194 |

OTHER PUBLICATIONS

"Centralized Storage Caching," Gear6, www.gear6.com/centralized-storage-caching.
Datasheet: CACHEfx™ Scalable Caching Appliance, Gear6.
"Accelerating Software Development with Centralized Caching," Gear6.
"Server Virtualization: Avoiding the I/O Trap," Gear6.

* cited by examiner

*Primary Examiner*—Jack A Lane
(74) *Attorney, Agent, or Firm*—Blakely, Sokoloff, Taylor & Zafman LLP (57) ABSTRACT

A dynamic cache system is configured to flexibly respond to changes in operating parameters of a data storage and retrieval system. A cache controller in the system implements a caching policy describing how and what data should be cached. The policy can provide different caching behavior based on exemplary parameters such as a user ID, a specified application or a given workload. The cache controller is coupled to the data path for a data storage system and can be implemented as a filter in a filter framework. The cache memory for storing cached data can be local or remote from the cache controller. The policies implemented in the cache controller permit an application to control caching of data to permit optimization of data flow for the particular application.

25 Claims, 5 Drawing Sheets

Prior Art

SYSTEM AND METHOD FOR IMPLEMENTING A DYNAMIC CACHE FOR A DATA STORAGE SYSTEM

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to caches employed with a data storage and retrieval system, and more particularly to systems and methods for dynamically specifying information caching in a data storage and retrieval system.

A cache is a temporary memory storage used to store information from a typically larger and slower memory storage. Fast memory storage can be relatively expensive to implement in large quantities. Larger, slower memory storages have economic advantages, with corresponding reductions in performance. A smaller, faster memory storage used as a cache as a front end to a larger, slower memory storage can increase performance over the large memory storage alone, while not significantly impacting overall costs.

The advantages of a cache are realized by implementing the cache with a storage memory that is faster than the large memory storage. Data that is frequently accessed in the large memory storage can be temporarily stored in the cache, so that faster overall access times for the data may be realized. Typical cache implementations involve some type of fast RAM memory storage, such as dynamic RAM (DRAM), that temporarily stores data from a larger memory storage, such as static RAM (SRAM), ROM or disk storage. For example, CPUs often use one or more caches to improve data access times for instructions and data read from a main memory. Data storage and retrieval systems typically use one or more caches to temporarily store data read from, or to be written to, a mass storage device such as a disk storage device. In practice, a cache typically improves performance by storing data that is frequently accessed, such as variables that are updated regularly. The use of a cache in the form of a fast memory storage device to store frequently accessed data is typically highly effective in speeding or streamlining data access in a data storage and retrieval system.

Depending on the implementation, a given large memory storage and an associated cache can be constructed to have all read and write accesses from an entity seeking access to data on the large memory storage occur through the cache. That is, when an entity seeks access to the data on the large memory storage, the access request is applied to the cache, and then, if the data is not in the cache, to the large memory storage. Accordingly, the entity receives data from the large memory storage through the cache, rather than directly from the large memory storage. Once the data is stored in the cache, future access requests for the data receive a response directly from the cache, rather than making another request to the large memory storage.

Other cache and large memory storage relationships can be implemented as well. For example, read requests to the large memory storage when the data is not in the cache can be processed to return the read data directly from the large memory storage to the requesting entity, as well as storing a copy of the read data in the cache. Similarly, write requests can be implemented to write directly to the large memory storage when the data is not in cache, without causing the data to be fetched to the cache from the large memory storage.

In a data storage and retrieval system, large memory storage, also referred to as mass storage, is typically implemented with a disk storage device, referred to here as a "disk." When a cache is used, as an entity requests data from the disk, the data retrieval and storage system typically first checks the cache to determine if any of the requested data is contained within the cache. If the system determines that the requested data is in the cache, the data is returned to the requesting entity directly from the cache. The determination that requested data resides within the cache is known as a "cache hit." The percentage of requests or accesses to data that result in a cache hit is referred to as a "hit rate" or "hit ratio" for the cache. Similarly, when a request for data from disk is compared against the cache and the data is not found, the event is known as a "cache miss." A cache miss usually calls for the data to be read from disk into the cache to provide the data to the entity making the data access request.

When a cache becomes full, or reaches a predetermined threshold of data content, new data read into the cache causes older data to be overwritten or ejected. The exercise of replacing or ejecting data from the cache is typically controlled using a replacement policy. A replacement policy is a structured operation for deciding which data in the cache should be overwritten or ejected. An example of a replacement policy is based on a least recently used (LRU) algorithm, which identifies least recently used data locations in the cache. If the data in the identified data location need not be stored on disk, the data location is marked as free and the new data read from disk overwrites the marked location. If the data identified in the data location is to be stored on disk, the data is written to disk prior to the newly requested data being read into the cache. Writing the data to disk and fetching the requested data to the cache involves two accesses to disk in the event of such a cache miss. Other types of replacement policies, sometimes referred to as cache algorithms, may be implemented. A cache algorithm can be customized based on such parameters as the size of the cache, the size of the data elements stored in the cache, latencies and throughputs of the cache and the mass storage, as well as other criteria impacting operation of the storage and retrieval system.

An entity such as a user or application program seeking to write data makes a write request, which causes the cache to be checked for the data location sought to be written. If the data locations to be written are found in the cache, the write takes place directly to the cache to take advantage of fast access for writing data. Alternately, in the event of a cache miss, the data can be written to disk without fetching the data location contents into the cache.

In some implementations, data written in the cache is subsequently written to disk after a predetermined interval of time, or in response to a predetermined set of events. For example, data written to the cache may be written to disk after a given interval of time measured from the write to the cache. The time interval helps to avoid a large disk access workload by spreading out disk accesses. Data to be written to disk may also or alternately be queued to help manage disk access workload. Data written to the cache may also be written or "committed" to disk when new data is to be read into the cache from disk, calling for a replacement of the data written to the cache. For example, if the cache becomes full, or populated to a given threshold, a data access request for data that is not in the cache may call for specified cache data to be ejected, and if need be, the ejected data is written to disk. The cache locations that have been modified are noted to ensure being later written to disk. Locations in the cache with written or modified data are often referred to as "dirty."

Sometimes, processes are implemented to write directly to a disk and bypass the cache. A cache may contain a copy of data from disk, where the disk entry is modified by a bypassing process, in which case the data in the cache becomes "stale." Another example of when data in a cache may become stale is when two or more caches are configured to work together. For example, caches may be used in conjunction with each other to share copies of data for multiple disks. If one copy of the data changes while another does not change, the non-changing copy can be considered to be stale data.

Typically, caches are organized with a cache manager to implement caching algorithms, track dirty data locations and communicate with other cache managers or large memory storage to maintain data consistency between caches and large memory storage. Maintaining consistency for data across different caches or a cache and a large memory storage, for example, is known as "cache coherency."

Caches are typically configured for the system in which they are used with the intent of optimizing performance. Accordingly, cache implementations are specific to memory size and mass storage device parameters, such as latency or throughput, and are typically not designed to be flexible or scalable. A cache for a given data storage and retrieval system is usually specifically optimized for that system in terms of speed and performance, so that its operating characteristics are fixed. Because of the static nature of operational characteristics of such a cache, it is typically not capable of responding to changes in demands or changes in operating parameters in relation to the data storage and retrieval system.

SUMMARY OF THE INVENTION

The present invention provides a dynamic cache that can be configured to selectively cache data in accordance with at least one caching condition, also referred to herein as a caching definition or caching policy. The dynamic cache memory and caching policy can be configured to respond to changes in system operating parameters, such as application performance requirements or workloads. The dynamic cache can be implemented in conjunction with or independent of a system cache, such as may be provided in a data storage and retrieval system.

The system and method of the present invention includes a cache controller that implements caching based on one or more caching definitions. The caching definitions can cause different caching behavior based on parameters such as a user ID, a specified application or an expected or actual workload, for example. The cache controller, also referred to herein as a cache policy engine, is coupled to the data path for a data storage and retrieval system, and in particular can be located to have direct access to a storage device that implements the data storage and retrieval system. The cache memory for storing cached data need not be located proximate to the cache controller, but can be local or remote. The caching policies implemented by the cache controller permit an application to control caching of data to permit optimization of data flow for the particular application, as well as to adjust caching behavior depending on operating parameters. The dynamic cache can be implemented in addition to a system or storage device cache that is static. The storage device can be any type of memory storage, including dynamic RAM (D-RAM), read only memory (ROM), static RAM (S-RAM), disk storage, flash memory, battery-backed RAM such as S-RAM or D-RAM and any other type of digital data storage device. In a data storage and retrieval system, the large memory storage is often referred to as mass storage, typically implemented as combinations of disk storage, battery-backed RAM and D-RAM. The dynamic cache can be implemented as any kind of read/write storage memory, including RAM, D-RAM, S-RAM, flash memory, battery-backed RAM including S-RAM and D-RAM, high speed or solid state disk drives, and any other type of digital memory storage that can be implemented as a faster memory than main memory or mass storage.

According to one embodiment, the cache controller is disposed in the data path of an open file system such as Windows® or UNIX® variations, for example. The cache controller is "hooked" into the data path to intercept file I/O accesses, identify access parameters and apply a caching policy based on the parameters to selectively cache file data. The access requests to a system mass storage device, such as a disk, result in caching activity according to one or more caching policies implemented by the cache controller. The one or more caching policies are definitions of caching behavior that indicate what caching activity should take place, and the cache controller implements the caching activity. An example of an open system caching policy is: "cache data read from disk and do not cache writes to disk" for a specified application. The definitions for the caching policies can be configured through a user interface, which also permits the cache to be inserted or removed in the open system data path.

In another embodiment, the dynamic cache can be implemented as a filter in a data storage and retrieval system that includes a filter system implementation. A filter system is a structured framework for implementing filters for a file system. The framework includes a filter controller that intercepts I/O accesses and handles request and response calls to filters that are registered with the filter framework. The filters can be loaded or unloaded in the filter system. When a filter is loaded, it registers for I/O operations for which it should be called. The filter controller identifies desired parameters in I/O accesses and calls the appropriate filter based on the given I/O event, and passes parameters to the called filter. The filter can operate on a file access or based on block accesses. A filter system is described in U.S. patent application Ser. No. 11/789,073, filed Apr. 23, 2007, the entire contents of which is hereby incorporated herein by reference.

In such an embodiment, a dynamic cache is implemented as a cache filter that is loaded into the filter framework under control of the filter controller. The cache filter registers to be called in the event of specific read or write access requests to the mass storage device to which the filter controller is coupled. The cache filter includes a cache controller that implements a caching policy in part by registering with the filter controller for specific read or write access requests. The filter controller calls the cache filter upon the occurrence of a registered event, identifies desired parameters associated with the I/O access and passes appropriate parameters to the cache filter. The parameters can be items such as a user ID, an application ID, an operation such as read or write, and other criteria involved in an access request or response. The cache controller determines how the access request or response should be treated based on the cache policies and cache definitions implemented in the cache controller and applies a caching policy to the data associated with the access.

For example, if the filter controller calls the cache filter based on the occurrence of a registered event, the cache controller handles the call and determines caching activity for the data access event based on the caching policies. If the data access event is a read request, and the relevant caching policies indicate that the data read from a disk device should be cached, for example, the cache controller caches the read data in accordance with the cache implementation. For example, the cache controller checks the cache storage to determine if the data to be read is located in the cache storage. If so, the data can be directly returned to the requesting entity and avoid an access to the disk device. In this case, the cache controller passes the cached data to the filter controller, which subsequently passes the data to the requesting entity. If the data to be read is not located in the cache, the cache filter submits a request for the data to be read from the disk device. The request submitted by the cache filter can be made directly to the disk device or through the filter controller. The data operations conducted by the filter controller can be based on file accesses in a file system, or can be block oriented accesses implemented with block oriented protocols.

By implementing the dynamic cache as a filter in a filter framework, various advantages involving modularization and flexible operation are realized. Modularization is a paradigm for constructing a system where functional system elements are organized in individual modules. Organizing functional system elements as modules contributes to ease of design, including modification of the system, or implementation of new functional elements in the system, as well as improving system robustness. For example, multiple caches may be implemented as multiple cache filters, each for specific tasks with specific behaviors.

BRIEF DESCRIPTION OF THE SEVERAL VIEWS OF THE DRAWINGS

The disclosed system and method are described in greater detail below, with reference to the accompanying drawings, in which.

DETAILED DESCRIPTION OF THE INVENTION

A cache acts as an intermediate memory storage between a larger, slower memory storage and an entity requesting access to data in the large memory storage. The entity requesting access to the data can be, for example, an application, a CPU, a network component, a client or server computer or any other type of digital device or software running on a digital device that can be linked or coupled to a data path to access data on a large memory storage. An application can be implemented as an organized, set of program instructions executable by a processor. A CPU is a central processing unit, such as is typically implemented with a processor for executing program instructions. A network component is a device connected to a network, typically for communication over the network and sharing network resources. A client computer is typically implemented as a network component that sends and receives information over the network, and includes a CPU that executes program instructions, typically in conjunction with an application running on one or more other network components. A server computer is typically implemented as a network component with one or more CPUs that can run applications in conjunction with a client computer or other network components. A digital device is understood to have some type of memory used to store data, either virtually, as in the case of an application, or physically. The large memory storage may be random access memory (RAM), read only memory (ROM) or a disk device, as examples. In general, any type of digital storage device may be used to implement the large memory storage.

When the large memory storage is implemented as a disk storage device, data is often stored or retrieved in groups of bytes referred to as a "block." Typically, accesses to a disk device result in transfers of discrete sets of blocks. For example, a file, directory or other data structures may be composed of one or more stored blocks. Storage architectural components such as metadata and index nodes (inodes) also use block storage. Metadata refers to information about characteristics of blocks, files and directories, including how the blocks, files and directories are organized. An mode contains information about how blocks are organized in a tree structure so that particular blocks can be indexed or located. The systematic organization of the blocks of data on a disk device is called a file system.

Block based data access protocols include the small computer systems interface (SCSI) protocol encapsulated over TCP (transmission control protocol) (iSCSI) and SCSI encapsulated over Fibre Channel (FCP). These block based access protocols can reference logical units (LUs) that are collections of blocks that may be drawn from several different physical devices or device segments including partitions. A physical device may be referenced with a logical unit number (LUN) to indicate a source of physical blocks that is used to build the collection of blocks. The LUs are referenced with LU IDs, which typically represent a starting point in the collection of blocks. Individual blocks or sets of blocks are referenced with a block offset or block number, which typically represents an offset value from the LU ID into the collection of blocks. For example, block 300 is the $300^{th}$ block in the collection starting from the LU ID.

In one well known file system, a change to a block of data results in a new block being written to the disk device as part of the data structure associated with the block change. The data structure may be a file, directory or other type of file system block organizations. While the newly written block includes the changed data, the block from which the data originated remains unchanged and reserved on the disk device. The convention of writing changed block data into a new block of storage on the disk device to preserve the previous state of the block facilitates retention of prior versions or backup data. In addition, this type of configuration for a file system provides a simple block reference technique to permit fast retrieval of blocks of data that have some association, such as belonging to a common file. In addition, this type of configuration for a file system facilitates recovery of data, or prior versions of blocks, through relatively simple measures. One type of implementation of this type of file system is referred to as the write anywhere file layout "WAFL", available from Network Appliance, Inc., of Sunnyvale, Calif.

According to an exemplary embodiment, block oriented accesses may be conducted in a file system, including a WAFL file system, using block oriented protocols such as iSCSI or FCP. These block accesses can be used in accordance with the present disclosure to dynamically cache individual blocks or entire LUs. In the event a cache is used with a disk device that can access data on a block basis in a WAFL file system, caching of the block is distinguished based on how the data is to be manipulated. For example, if only a portion of the block is to be changed, the entire block is read from the disk device, with a copy being placed in the cache. The portion of the block is modified as desired in the cache, and the entire modified block is written to the disk device in a new block location. The write operation from the cache is done in accordance with the configuration of the cache, e.g., the modified block is written to disk after a given interval of time.

According to an exemplary embodiment, a block oriented write to a disk device in a WAFL file system that involves modifying less than an entire block causes the entire block to be read from the disk device into the cache. The modified block is subsequently written to the disk device at a later time. If a write operation to the disk device in a WAFL file system is directed to writing entire blocks of data, the blocks are directly written to the cache or disk device. In such an instance, there is no need to retrieve a block of data from the disk device or cache to be modified. The newly written blocks are stored in new locations on the disk device in accordance with the WAFL system. If the entire blocks of data are located in the cache, then the write operation targets the cache, with each of the complete data blocks being written out of the cache to new locations on the disk device at a later time. An append operation is an example of an instance where new data blocks are directly written to cache or disk without first fetching blocks from disk. The append operation expands the data structure by adding blocks assigned to the data structure. If the data structure to which the data blocks are to be appended is resident in the cache, and the cache has enough room, memory locations in the cache can be allocated for the appended data blocks. Conducting append operations in cache memory can contribute to improving access times for the newly appended data blocks.

Figure 1:
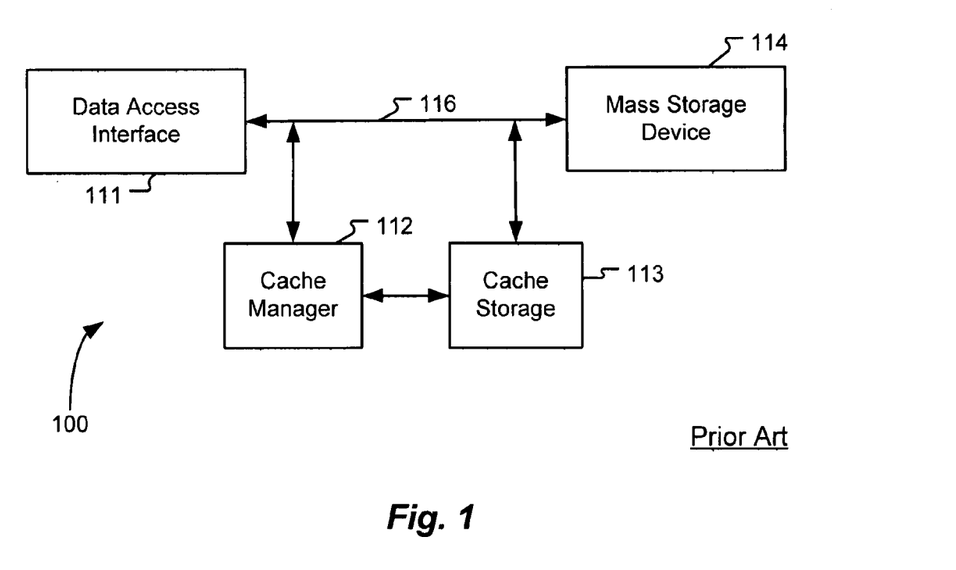
FIG. 1 is a diagram illustrating an implementation of a conventional cache.

FIG. 1 shows a typical conventional configuration for a system employing a cache storage 113 for temporarily storing information maintained in a mass storage device 114. Cache storage 113 operates under control of a cache manager 112 to determine when information is to be fetched from mass storage device 114, or when information is to be written from cache storage 113 to mass storage device 114. Caching operations typically initiate with a request for access to data by a requesting entity through a data access interface 111. The entity requesting access through data access interface 111 can be an application, a CPU, a network component, a client or server computer, or any other type of digital device or software running on a digital device. Data access interface 111 provides read/write access requests to mass storage device 114. Access to mass storage device 114 can be for the purpose of reading or writing persistent data. In the following discussion, accesses to mass storage device 114 may involve requests or responses when read or write operations occur. Accordingly, the terms "accesses" or "requests" or "responses" refer to activities that may involve either a read or a write operation, or both.

Cache storage 113 maintains a temporary subset of information stored in mass storage device 114. The data stored in cache storage 113 is a function of the requests received from data access interface 111. Cache storage 113 is significantly faster and smaller than mass storage device 114, with the intent of providing a fast response to requests from data access interface 111 when a cache hit is realized. A successful access to cache storage 113 is referred to as the "fast path" for the data access, due to the fast response provided by cache storage 113.

Mass storage device 114 can be any type of memory storage, including processor memory accessible by a CPU of the processor or main memory associated with a processor and typically located proximate to the processor for fast access. Mass storage device 114 may also be disk storage or peripheral storage such as add-on memory in the form of connectable devices that can be coupled to various busses, such as a PCI bus, a USB bus, parallel and serial ports, and any other kind of processor accessible bus or port. Mass storage device 114 may also be combinations of the above types of memory storage, and in the abstract is meant to illustrate any memory storage with which a cache may be implemented. Accordingly, while the following description is generally directed to disk storage devices in a data storage and retrieval system, it should be apparent that the present invention is applicable in any type of memory storage configuration in which a cache may be implemented.

Caching system 100 operates based on requests and responses from and to data access interface 111. When data access interface 111 provides a request for data to mass storage device 114, cache manager 112 identifies the data sought by the request and examines cache storage 113 to determine if the requested data is cached. If the requested data is located in cache storage 113, the data is returned to data access interface 111 directly, without resort to fetches from mass storage device 114. When the requested information is found in cache storage 113, the event is described as a "cache hit." If the data requested by data access interface 111 is not found in cache storage 113, the event is described as a "cache miss," and the requested data is fetched from mass storage device 114 to data access interface 111. When the requested data is fetched from mass storage device 114, a copy of the requested data is stored in cache storage 113. Subsequent requests for the data from data access interface 111 results in a cache hit for cache storage 113 if the data remains in cache storage 113. The requested data is then returned directly to data access interface 111 from cache storage 113, and then to the requesting entity.

In a write operation, data access interface 111 submits write requests to modify information maintained on mass storage device 114. The write request is used by cache manager 112 to identify the data sought to be written and determine whether the data to be written is located in cache storage 113. If the data to be written is located in cache storage 113, the write data specified in the write operation is written to cache storage 113, without immediate resort to accessing mass storage device 114. The write operation can modify a portion of grouped data, such as a portion of a block of data, rather than writing the entire group or block. When data is written or modified in cache storage 113, the data is marked as "dirty" to indicate that the data should later be written to mass storage device 114 to commit the written changes to the more permanent storage of mass storage device 114. Dirty data in cache storage 113 may be written or "flushed" to mass storage device 114 in accordance with a given algorithm, such as may be implemented based on an interval of time or data access events.

It is feasible in system 100 to have other processes interact directly with mass storage device 114 to modify data so that cache storage 113 is not involved. In such a case, it can be challenging to maintain consistent versions of the relevant data if there is a copy of the data in both cache storage 113 and mass storage device 114. This issue of data consistency is referred to as "cache coherence." When cache storage 113 contains an older version of the requested data compared to the version on mass storage device 114, the data in cache storage 113 is said to be "stale." A number of approaches are available to keep the data shared by cache storage 113 and mass storage device 114 consistent across the different storages. For example, cache manager 112 may determine that cache storage 113 contains data requested to be modified. Cache manager 112 may then "lock out" other processes from modifying the data on mass storage device 114. For example, cache manager 112 may indicate that the data to be modified on mass storage device 114 is contained in cache storage 113. The indication from cache manager 112 may be used to "lock out" other processes from modifying the data on mass storage device 114 so that the data can be modified without conflict. Once the data in cache storage 113 is modified, it is written to mass storage device 114, and the lock out is removed to permit other processes to access the data. Alternately, or in addition, cache manager 112 may cause the modified data in cache storage 113 to be written to mass storage device 114 and removed from cache storage 113, before permitting the data to be available to processes that directly interact with mass storage device 114. The above and other techniques may be used to maintain cache coherence while continuing to provide improved access performance.

Figure 2A:
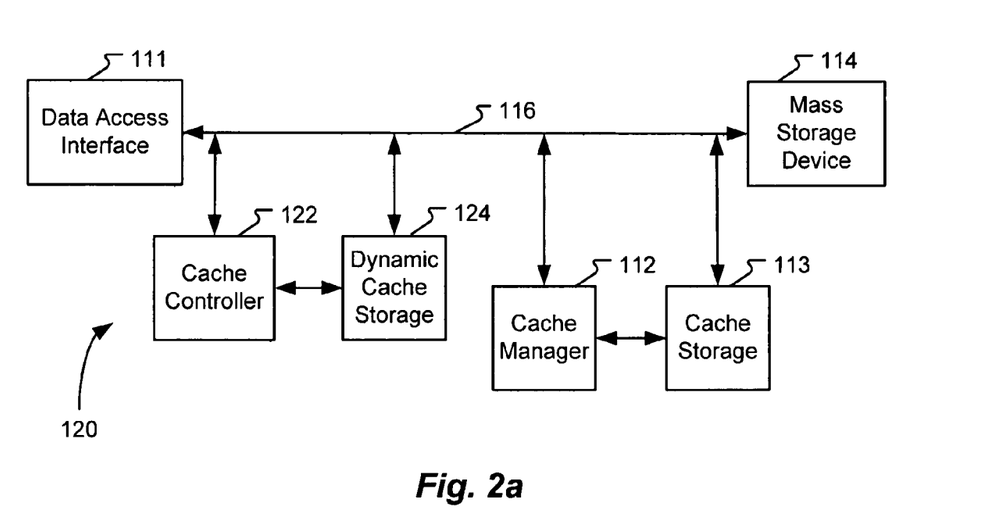
FIG. 2 is a diagram illustrating an implementation of a dynamic cache in accordance with the present disclosure.

Referring now to FIG. 2a, an embodiment of the present invention is illustrated as a data storage and retrieval system 120. System 120 includes data access interface 111 and mass storage device 114, similar to system 100 (FIG. 1). System 120 also illustrates conventional cache manager 112 and cache storage 113, which are used as a system cache to enhance access performance of mass storage device 114, similar to the configuration of system 100 illustrated in FIG. 1. In accordance with the present invention, a cache controller 122 and a dynamic cache storage 124 are implemented in system 120. Cache controller 122 and dynamic cache storage 124 are coupled to a data path 116 that provides a connection between data access interface 111 and mass storage device 114. As an example of one implementation of data path 116, data access interface 111 and mass storage device 114 may be connected with a bus architecture that is shared by a number of different devices. Cache manager 112 and cache controller 122 receive and analyze bus data for particular information indicating a data access request or response and determine whether cache storage 113 or dynamic cache storage 124 should be connected to the bus to send or receive data on the bus.

Cache controller 122 analyzes the access requests provided by data access interface 111, and the responses provided by mass storage device 114, to control data stored in dynamic cache storage 124. The determination of how data should be selectively stored in or removed from dynamic cache storage 124 is based on parameters related to the data access requests and responses and the caching policies implemented in cache controller 122.

The caching policies implemented in cache controller 122 can operate on individual data accesses, including block accesses, as well as other parameters related to data access requests or responses to determine if the data related to the access should be cached. The data parameters may include request or response variables related to a read or write operation that identify the data as associated with a particular application, a particular user, a particular group of users, a particular device, or any other type of identifiable criteria that can be derived from the data access request or response to determine if the data should be cached in accordance with a caching policy. Cache controller 122 can also implement a cache policy to modify the size of dynamic cache storage 124, or modify specific portions of the memory in dynamic cache storage 124. For example, dynamic cache storage 124 may be configured as several different caches for specified purposes such as being dedicated to a particular application. The cache policy may modify the size of the specific cache in dependence upon data parameters or other criteria, such as time or date information or signals from the application. The caching policies may also be configured or reconfigured as needed through a configuration interface, as described in greater detail below.

Numerous data parameters related to a data access request or response can be employed to define a caching policy. A caching policy or caching definition is a logical description of data access events that prompt a caching activity. A caching activity refers to the act of caching data or preventing data from being cached, when the data is read from or written to large memory storage. A caching policy operates to implement a caching activity based on the occurrence of an event defined by a logical description of a combination of parameter values associated with the results of implementing data access or response. Examples of caching policies include expanding a size of a cache, enabling or disabling a cache, preventing data associated with the data access event from being cached, or caching data associated with the data access event. Other caching operations can be implemented through caching policies as well, such as caching data using multiple caches for different purposes, or any other type of cache control operation.

The caching policies can be constructed on the basis of parameters drawn from a variety of sources, including parameters associated with the data access event, such as information drawn from the data access request or response. Some examples of parameters that may be used to construct cache policy definitions include a user identification (ID) an application ID, a process ID, a thread ID, a client source ID, user credentials or process credentials. A user ID is an identifier assigned to a given user of the data storage and retrieval system. An application ID is an identifier for an application running in or accessing the data storage and retrieval system. A process ID is an identifier for a process running in or accessing the data storage and retrieval system, which process may be associated with an application ID. A thread ID is an identifier for a process thread, of which several may be running for a given process. A client source ID is an identifier for a client in the data storage and retrieval system. The client source ID can be used to identify the client computer from which the data access request originates, or to which the data access response is directed, for example. The client computer can be local or remote to the data storage and retrieval system. User credentials represent a set of information that is associated with a user and user permissions. For example, user credentials may include a login ID and/or password or a uniquely specified identifier associated with a user session. Process credentials represent a set of information associated with a process, such as access rights granted to the process.

Caching definitions may also use information related to groups of parameters or group identifiers to indicate conditional caching situations. Groups of parameters may include groups of users, applications, processes, threads, client sources and groups of data accesses. Group identifiers can be used to refer to parameters grouped together for a specific purposes, such as a group of user IDs that are assigned a specific set of data access rights. Similarly, a group ID may be formed for applications, processes, threads, client sources, user credentials and data access groupings. Other parameters that may be used to construct caching definitions include operation type, such as read or write, for example, an access target or target parameter, such as a volume, directory, file or block, or file offset, for example. The caching definitions may also include logic structures to implement caching behavior based on time of day or a date value. A data access request and/or response sequence may also be used as a parameter for a caching definition to implement particular caching behavior.

The caching definitions may be used to implement caching behavior based on expected or actual workloads. For example, if an application is expected to have a high priority at a given point in time, such as a payroll application at an end of a calendar month, the application can be assigned a cache, or have more resources allocated for an existing cache to handle the expected workload. The assignment of a cache or additional resources for an existing cache can be done on a dynamic basis using caching definitions that can include time of day or date parameters and application ID, for example.

Figure 6:
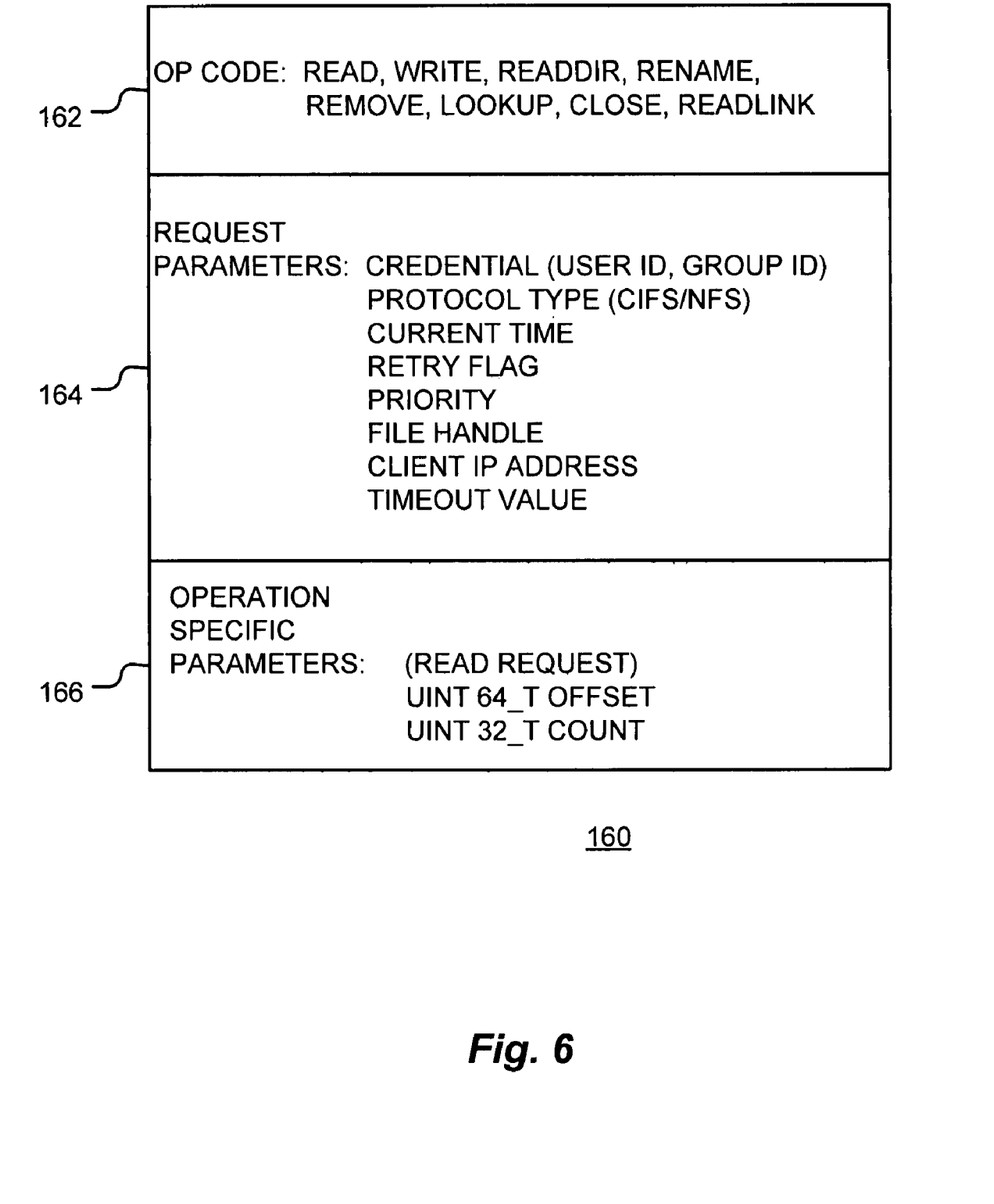
FIG. 6 is a diagram of the structure of an exemplary access request.

Referring for a moment to FIG. 6, a structure of a data access request example is illustrated as structure 160. Structure 160 illustrates a data access read request having three fields 162, 164 and 166. Field 162 is an OP code (operational code) field in which operation for the data access is described. The illustrative operations provided in field 162 include read, write, read DIR, rename, remove, look up, close and read link. It should be apparent that any other kind of OP code may be used in the data access to deliver information or instructions to the target memory storage device. Field 164 provides generic parameters related to a data access read request. The exemplary parameters for the read request include credentials, such as a user ID or group ID, protocol type, such as CIFS (Common Internet File System) or NFS (Network File System). Other parameters in field 164 may include the current time of the request, a retry flag indicating whether access denial should result in an access retry, priority of the access request, a file handle, a client IP address and a timeout value for a response to be received by the client. In field 166, operation-specific parameters are illustrated for the read request, including an offset in the file identified by the file handle and a count for how many data elements should be read starting at the offset.

Any of the components of field 162, 164 or 166 may be used as parameters to construct caching definitions in accordance with the disclosed system and method. For example, the read request illustrated in structure 160 can supply a file handle in field 164 that is identified in a caching definition to cause the associated file to be cached upon the data being read from a mass storage device. The framework of the caching definitions thus provides a very flexible and powerful technique for determining caching behavior based on data accesses.

Referring again to FIG. 2a, dynamic cache storage 124 can work in conjunction with or separately from cache storage 113. For example, cache storage 113 can be implemented as a conventional system cache that temporarily stores all data related to data access requests, as is described above with respect to system 100 of FIG. 1. In such a configuration, cache storage 113 can be thought of as a front end of mass storage device 114 so that dynamic cache storage 124 selectively stores data associated with access requests that are directed to and from cache storage 113. Dynamic cache storage 124 can act as a dedicated or special purpose cache that selectively caches data on the basis of a caching policy. In addition, a number of dynamic caches may be implemented similarly to dynamic cache storage 124, under control of cache controller 122. Alternately, or in addition, a number of cache controllers and dynamic caches can be implemented in data path 116, each having independent caching policies or dedicated purposes, for example.

Figure 2B:
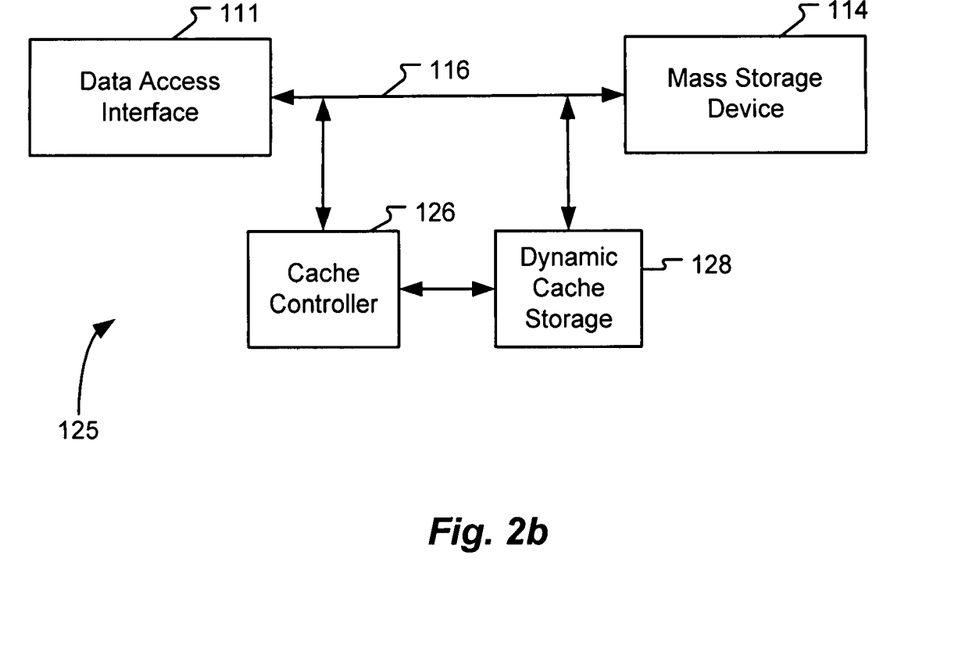

Referring now to FIG. 2b, another embodiment of the present invention is illustrated as a data storage and retrieval system 125. System 125 includes data access interface 111 and mass storage device 114, similar to system 100 (FIG. 1). In addition, a cache controller 126 and a dynamic cache storage 128 are coupled to a data path 116 between data access interface 111 and mass storage device 114. Cache controller 126 and dynamic cache storage 128 can be implemented as cache controller 122 and dynamic cache storage 124, respectively.

In the configuration of system 125, cache controller 126 and dynamic cache storage 128 can take the place of a system cache, such as is implemented with cache manager 112 and cache storage 113 of system 100 shown in FIG. 1. A number of advantages in accordance with the disclosed system and method can be realized when cache controller 126 and dynamic cache storage 128 take the place of cache manager 112 and cache storage 113, or when cache manager 112 and cache storage 113 are implemented as cache controller 126 and dynamic cache storage 128. For example, one advantage that can be attained is a dynamic system cache that can be modified in accordance with a variety of parameters, including workload, applications, identified users and other parameters that may impact caching operations in a data storage and retrieval system.

Cache controller 126 intercepts and analyzes data access requests and responses and controls caching based on parameters associated with the data access requests and responses, the contents of cache storage 128 and caching policies implemented in cache controller 126. Cache controller 126 intercepts and analyzes requests and responses from both data access interface 111 and mass storage device 114. Cache controller 126 determines whether the requests or responses call for storage of data in cache storage 128, in accordance with the caching policies implemented in cache controller 126. Accordingly, system 125 permits the selective caching of identified data in cache storage 128 based on the caching policies implemented in cache controller 126. Thus, cache controller 126 permits flexibility in data access paths and speed with respect to data transferred between data access interface 111 and mass storage device 114. The caching policies or definitions can be configured or reconfigured as needed through a configuration interface, as described in greater detail below.

Caching policies may be configured based upon a priority or indication of importance, which can be taken from a data access request or response, or can be configured based on designated parameters. For example, the request or response may include a priority indication, as shown in field 164 of structure 160 illustrated in FIG. 6. Priority may also be configured with caching policies or definitions based on request or response parameters, such as user ID or application ID. For example, a user may submit a data access request through data access interface 111 that includes a parameter that is identified in a caching policy in cache controller 126 as having low importance, or having a low priority level. An example of such a low-priority request is retrieval of a monthly status report, e.g., a non-time critical event, or an event not subject to large numbers of ongoing updates on a frequent basis. The requested data may be provided directly from mass storage device 114 to data access interface 111 without caching the data, so that the response speed for the non-important or low priority data is reduced. Similarly, important or high-priority data requests through data access interface 111 can be identified by cache controller 126 and processed in accordance with an associated caching policy. An example of a high-priority request is security access information, where the request or response performance is critical to achieving the objects of the task. The associated caching policy causes the important data fetched from mass storage device 114 to be selectively stored in dynamic cache storage 128 to improve access performance.

A caching policy can also be defined to cause a change to the size of a cache based on given criteria. For example, cache controller 126 may see a number of high priority data requests, such as those related to a payroll application for a company, at a critical time, such as calendar month end. Cache controller 126 can allocate additional resources to a cache for the payroll application, based on caching policies, to assist with performance improvements during the heavy workload intervals. A caching policy can also be configured to indicate to cache controller 126 to provide the payroll application with one or more caches to improve performance during heavy workload intervals. Cache controller 126 can provide caches for different purposes, such as read cache and a write cache. Accordingly, cache controller 126 can act on caching policies to attain flexible and dynamic caching for specific types of data, effectively allocating performance or processing speed to individual access situations.

Figure 3:
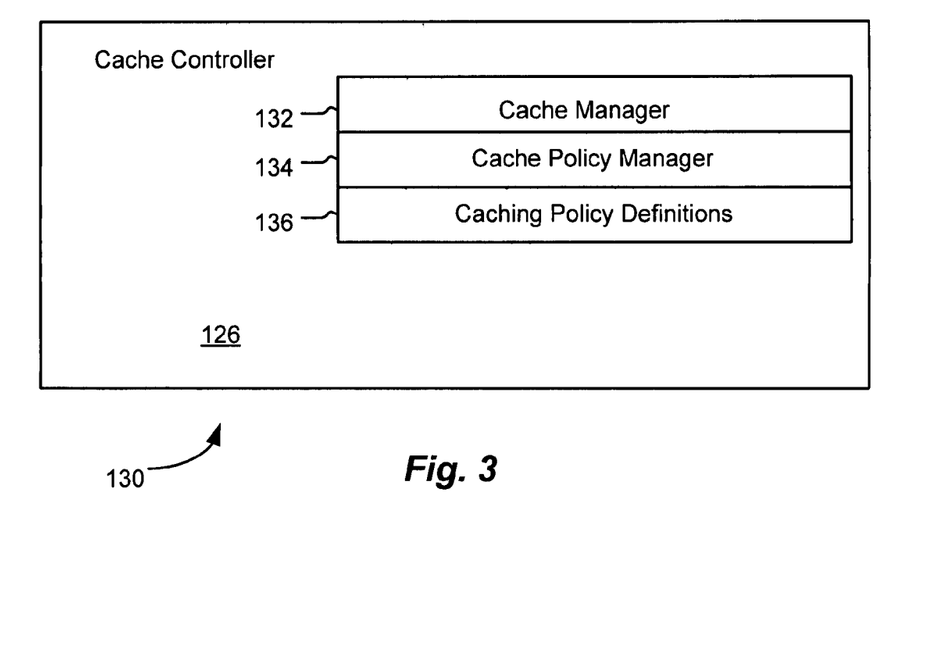
FIG. 3 is a diagram of a cache controller in accordance with the present disclosure.

Referring now to FIG. 3, a block diagram 130 illustrates components of cache controller 126. Cache controller 126 includes a cache manager 132, a cache policy manager 134 and a set of caching definitions 136. Each of these components in cache controller 126 contribute to controlling cache storage 128 to permit an implementation of a dynamic cache with flexible caching operations. Cache controller 122 illustrated in FIG. 2a can also be implemented as cache controller 126.

Cache manager 132 performs functions similar to cache manager 112 (FIG. 1), such as identifying requested data and determining when requested data should be fetched from mass storage device 114 into cache storage 128, or when data should be written from cache storage 128 to mass storage device 114. Cache manager 132 also tracks data stored in cache storage 128 and tracks modified data located in cache storage 128. Cache manager 132 can also create and delete caches, and can implement caches with specific operating characteristics, such as a read cache or a write cache. Cache manager 132 also determines when modified or dirty data should be written or "flushed" to mass storage device 114.

Caching definitions 136 provide logical descriptions of data access events that trigger or avoid caching. For example, caching definitions 136 can enable or disable caching for individually specified applications, processes, or threads executing in a process. A process is an instance of a computer program that is being executed, for example to carry out the objectives of an application. Multiple processes may be executing in a computer operating system to carry out the objectives of various applications or operating system tasks. A thread is a portion of a process that may execute in parallel with other process threads to carry out process tasks while sharing resources such as address space or process parameters.

If caching definitions 136 call for an application, process or thread to have no cache, access requests and responses are passed directly between data access interface 111 and mass storage device 114. Such directly passed requests or responses have slower response times or reduced performance, and such treatment is usually referred to as the "slow path." As another example, caching definitions 136 include a description to identify a user or user group and cache manager 132 enables a cache based on the identification. With such a definition, individual users or groups of users can have a cache enabled upon submission of a data access request for improved performance. Another example of a caching definition describes a time interval or a workload for a given application, process or thread. Cache manager 132 compares the time value provided in a data access request or response with a time interval provided in caching definitions 136 and enables or disables a cache based on the comparison result, for example. Alternately, an application can be assigned a cache during an increased workload, such as by comparing access request or response priority with that provided in caching definition 136. As priority increases, the application is assigned a cache to handle extra workload, for example. As priority decreases, the cache can be removed. Caches that are already assigned can also be modified dynamically to have an increased or decreased size for a given time interval or to handle a particular expected workload, for example. Enabled caches or cache size modifications can also be scheduled through cache policy definitions, so that expected increased or decreased performance demands can be met.

Referring to FIG. 6, an exemplary data access request format is illustrated as a data structure 160. The data access request illustrated in structure 160 is a file system read request with several different fields related to the file access request. A field 162 includes an operational code (OP code) for the operation indicated in the access request. Examples of OP codes include read, write, readdir, rename, remove, lookup, close and readlink. OP codes in field 162 may be used by caching definitions 136 to define operations that can cause dynamic caching activity. For example, a caching definition may state that if the OP code is "read," then uncached data should be placed in a read cache upon being read from mass storage.

A field 164 in structure 160 provides request parameters related to the type of request and the data. In the example illustrated in structure 160, the operation is a read request and the request parameters include credentials, protocol type, current time, a retry flag, priority, file handle, client IP address and a timeout value. As with the OP code in field 162, caching definitions 136 may define caching activity criteria based on the values of request parameters in field 164. Similarly, a field 166 includes operation specific parameters, in this case specific to a read request. The parameters provided in field 166 are an offset and a count related to the read request. The offset indicates a position in a file where a reading operation is to commence, and the count value indicate a number of discrete file portions to read from the offset, where the discrete file portions may be blocks of data, for example.

Block based access requests and responses, such as those provided according to iSCSI or FCP protocols may have different parameters than file based access protocols. For example, the request or response, in addition to the above discussed parameters, may include LU related values, such as an LU ID and block offset. The LU ID is equivalent to a block identifier, while the block offset refers to a block count taken from an initial block starting point indicated by the LU ID. The disclosed system and method is intended to be operable with any type of data access protocol, since caching definitions 136 can be constructed in accordance with any particular protocol arrangement, including file or block based protocols, for example.

Figure 4:
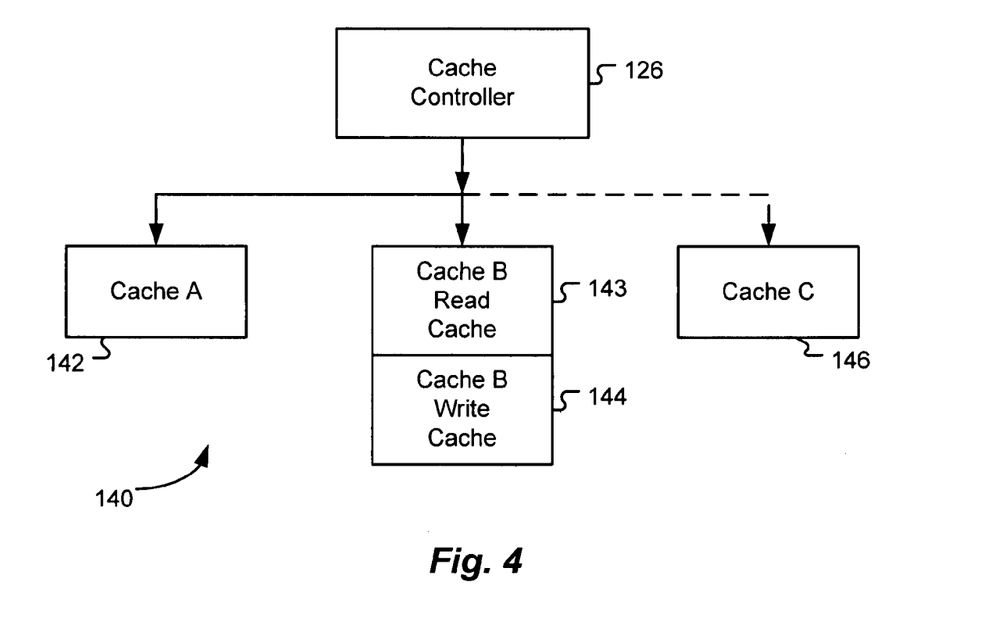
FIG. 4 is a diagram showing various implementations of dynamic caches in accordance with the present disclosure.

Referring now to FIG. 4, a caching system 140 illustrates caching features in accordance with the present invention. The flexibility of the caching system in accordance with the present invention permits cache controller 126 to manage a number of different caches for different purposes. For example, a cache 142 can be implemented for a particular user, user group or application, so that all read and write accesses are executed through cache 142. As another example, a cache B can be implemented to have a separate read cache 143 and a separate write cache 144. Different caching policies or definitions can be applied to read cache 143 and write cache 144 in accordance with the present invention. For example, a caching definition that includes priority criteria may indicate that low priority read requests shall bypass read cache 143 to obtain the requested data directly from mass storage device 114. In such a case, a caching definition 136 provides the logical information to process the priority parameter of a read request, such as is shown in field 164 of FIG. 6, to determine that the read request is low priority, so that the associated data should not be cached. Similarly, write cache 144 may have an associated replacement algorithm that flushes dirty data to mass storage device 114 based on priority. In such a configuration, priority and/or other request parameters related to a write request are analyzed and compared against caching definitions 136 to determine when specific data modified in write cache 144 should be flushed to mass storage device 114.

As another example, modified data in write cache 144 can be subjected to a cache coherence examination, where modified data in write cache 144 is written to mass storage device 114, and then copied or transferred into read cache 143. Similarly, data in read cache 143 may be modified, at which point it can be copied or transferred into write cache 144 and marked as dirty. In this exemplary implementation, all dirty data is maintained in write cache 144, while the data in read cache 143 is "clean," or unmodified. Accordingly, read cache 143 and write cache 144 can be synchronized to be consistent with each other while performing different specific functions. The interaction of read cache 143 and write cache 144 can be optimized for performance in a give application, such as by selectively setting commit times or commit events and/or replacement algorithm parameters, in conjunction with cache policies and definitions. For example, commit settings and replacement algorithms can be adapted with changes to caches, such as enabling, disabling, or size modifications, as specified by the cache policies or definitions.

Cache operations may also be optimized for a given task, such as, for example, database accesses. For instance, database accesses often cause data manipulation operations to be performed with high frequency on a given set of data over a given interval of time. A cache can be implemented to accommodate the frequently accessed data to maintain a high hit ratio for the cache, while avoiding excessive cache size allocation to maintain cache optimization and efficiency. Accordingly, a cache policy or definition can be implemented based on a variety of dynamic parameters, including cache hits, cache misses and cache hit ratios. For example, a cache policy and definition can be implemented to increase cache allocation size if the cache hit ratio decreases to a certain extent.

A cache in accordance with the disclosed caching system can be implemented in a storage system with a modular model to take advantage of system modularity. A modular model is a paradigm for constructing a system where functional system elements are organized in individual modules. Organizing functional system elements as modules contributes to ease of design, including modification of the system or implementation of new functional elements in the system, as well as improving system robustness. System modularity is the concept of separating functional system elements into sets so that one or more system functions can be isolated for operations such as review, test, upgrade, maintenance or deletion, for example. Due to the modularity of the disclosed caching system, cache controller 126 and a cache under its control need not be located at the same physical location. A cache 146 under control of cash controller 126 illustrates a remote cache C that is physically remote from cache controller 126. Accordingly, while cache controller 126 is positioned in a data path to capture read and write requests, the caches under its control can be located in separate memory or in a separate location accessed through a network, for example. In one exemplary embodiment, cache 146 may be located on a client computer that is at a remote location from mass storage device 114. Cache controller 126 can cause certain data retrieved from mass storage device 114 to be cached on the client computer in cache 146 in accordance with associated caching policies and definitions. By caching data locally on the client computer, data access performance can be improved by avoiding large peak data transfers between mass storage device 114 and the client computer that might incur large latencies in the transmission of data between mass storage device 114 and the client computer.

In an exemplary embodiment of the disclosed system and method, cache controller 126 intercepts requests and/or responses between data access interface 111 and mass storage device 114 and creates or deletes a cache based on the parameters associated with the intercepted accesses. For example, a user may make a request for retrieval of a document from mass storage device 114. Based on an arbitrary set of parameters associated with an access or the data storage and retrieval system, a caching definition 136 can be configured to cause a cache to be created to store the retrieved document. If another user attempts to access the same document, they can be directed to the cached copy of the document, thereby making more efficient use of cache resources while boosting performance.

Various criteria for deallocating or deleting a cache may also be provided based on arbitrary criteria including a time interval since a most recent access, or number of access requests. In the above example, if the users accessing the document cease accesses for a given period of time and no new access requests are received, the caching definitions associated with the cache can cause the cache to be deleted. Prior to deletion, the cache undergoes a clean up process, where changes to the document are written to mass storage device 114, for example. The cache is then deallocated or deleted. Alternately, if a cache is created for a number of users accessing an application, for example, and the number of users subsequently dwindles to a small number, criteria in caching definitions 136 can be used to specify that the cache should be deleted or deallocated, so that the few users of the application directly access mass storage device 114. By freeing the resources of the underutilized cache, the disclosed system and method make more efficient use of the resources, which tends to boost overall performance.

Caching definitions 136 may also include criteria for misses or hits for a given cache. For example, if a number of misses for particular data are observed, based on criteria in caching definitions 136, a cache may be created to help improve performance or more evenly distribute available resources. In the case where a created cache receives a limited number of hits, the cache can be deallocated in accordance with criteria specified in caching definitions 136. When a cache is created in accordance with criteria established by caching definitions 136, a cache key can be created for management of the cache. In the above example, if a cache is created for a document retrieved from mass storage device 114, the cache key can be attached to the document file so that additional accesses to the document by other users or entities, such as applications, are directed to the newly created cache. As users or entities are directed to the cache, they can be tracked in accordance with a caching definition 136 to determine whether the cache should be maintained. For example, a caching definition 136 can be formed to maintain the cache if there are more than 20 users accessing the document with an average hit rate of 50%. A criteria for cleaning up or flushing the cache and deleting it can also be established, such as if the hit rate drops below 20% or two users are accessing the cache, for example. The criteria described above for enabling or disabling a cache can also be used to expand or contract the size of a cache based on a desired result specified in caching definitions 136.

The dynamic cache according to the present invention may be implemented in a number of different ways in a number of different systems. For example, the cache controller for the dynamic cache may be injected into or ejected from a data path in an open system. Open systems include any of the various UNIX® based systems such as BSD®, AIX®, HP-UX® and Solaris®, to name a few. These types of systems have well-established insertion points in a data path for injecting a module that can operate on data transmitted in the data path.

Another type of open system provides application programming interfaces (APIs) that provide specific access to internal system components for achieving specific tasks. For example, the Windows® operating system provides APIs to access system components to achieve specialized programming tasks. An example of an API often used in the Windows® operating system is that related to disk accesses for use with antivirus software. Antivirus software consists of software programs configured to recognize, isolate and/or remove software viruses. A software virus refers to undesired codes, programs, commands or computer instructions, particularly those introduced into a computer system, network, program or data for malicious purposes. Viruses may (a) self-replicate or self-reproduce, (b) cause the loss or corruption of a program or data, (c) cause malfunction or interruption in operation of a computer system, network or other intelligent system, or (d) permit unauthorized access to a program, data, computer system, network or other intelligent system, for example. Typical antivirus software uses the exposed API to gain direct access to internal system components to ensure that potentially dangerous viruses can be intercepted before corrupting stored data.

The caching system according to the present invention can take advantage of the above described open systems, by injection into the data path, or making use of an available API to intercept read and write accesses for mass storage devices. In such an implementation, the disclosed caching system redirects data or control flow through the cache controller, which implements the desired caching policies or specified caches.

In addition to the above described open systems, some data storage and retrieval systems implement a structured framework for permitting modules to be added to the system for implementation of system functions. One such example of a structured system provides a filter framework that organizes filter modules for implementing functions related to data storage and retrieval. An example of such a filter framework is described in U.S. patent application Ser. No. 11/789,073, filed Apr. 23, 2007, referenced above and incorporated into the present disclosure. The above described antivirus software can be implemented as a filter in the above-described filter framework to intercept computer viruses, for example.

Figure 5:
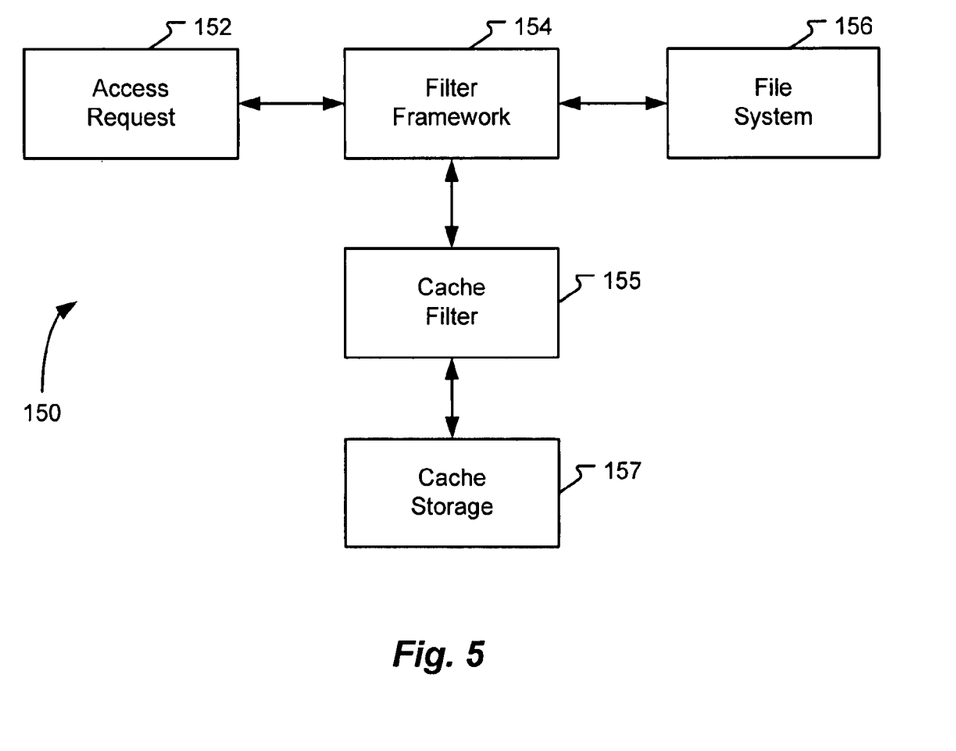
FIG. 5 is a diagram of an embodiment of a dynamic cache' as a filter in accordance with the present disclosure.

Referring now to FIG. 5, a data flow diagram for a data storage and retrieval system 150 with a filter framework 154 is illustrated. Data storage system 150 includes an access request module 152 that represents a source of access requests and destination of access responses. Access request 152 may be implemented through a computer as a standalone CPU, or can be derived from a gateway, router or bridge transmitting requests or responses through a separate network. Access request 152 may be implemented as data access interface 111, shown in FIGS. 1 and 2. The requests and responses from and to access request 152 are received or provided by a filter framework 154.

Filter framework 154 provides a structured mechanism for loading filter modules, starting and stopping filters, and unloading filter modules. The architecture of filter framework 154 permits filters to be called without the filters being inserted directly in the data path between access request 152 and a file system 156. File system 156 may be implemented as a WAFL file system available from Network Appliance of Sunnyvale, Calif., as described above. Other types of file system implementations may also be used. With the disclosed system and method, a dynamic cache can be implemented through a cache filter 155 and a cache storage 157 in conjunction with filter framework 154. Cache filter 155 registers with filter framework 154 to receive calls based on I/O events. Filter framework 154 intercepts I/O access events, identifies parameters within the I/O access requested by registered cache filter 155, and invokes cache filter 155 with a call. Filter framework 154 then passes parameters related to the I/O access event to cache filter 155.

In keeping with the operation of filter framework 154, cache filter 155 may register with filter framework 154 to be called according to a given call model configuration, including a synchronous, an asynchronous and an asynchronous release model configuration. The use of the synchronous model causes the filters associated with filter framework 154 to hold incoming I/O and block the calling thread until execution completes. An asynchronous configuration causes the filter to hold incoming I/O until execution completes, but releases the calling thread. The asynchronous release configuration causes the filter to execute without blocking incoming I/O or the calling thread. Incoming I/O refers to data locations that are being modified or used by a filter during filter execution, and can be locked or held to avoid modification of the data in the data locations until filter execution completes. A calling thread is a portion of a process that may execute in parallel with other process threads while sharing resources such as address space or process parameters. If a calling thread is blocked, other threads in the process may be interrupted until the calling thread is released.

The read events that may cause invocation of cache filter 155, that is, those events for which cache filter 155 registers to receive a call, include the commands for "read," "readdir," "read security" and "read attributes." Once called based on a read event for which it is registered, cache filter 155 determines whether and how the read data should be cached. As discussed above, a cache manager and caching definitions contribute to determining whether and how the read data is cached.

Cache filter 155 may also provide a dynamic cache configured for particular types of data access protocols. For example, cache filter 155 can receive calls based on registration for block based data accesses, as may occur with the iSCSI or FCP type data access protocols. Cache filter 155 can cause dynamic caching on a block-by-block basis if desired, based on the LU ID and/or block number information provided in the iSCSI or FCP block based access requests or responses. Cache filter 155 can register with filter framework 154 to receive calls when particular block based accesses occur. Cache filter 155 may register to receive calls based on an access to a particular collection of blocks denoted by the LU ID, accesses to a particular block number or combinations of either, as well as different accesses such as reads or writes. Cache filter 155 can then selectively cache blocks of data based on the call and any parameters associated with the access or as defined in the caching definitions.

Cache storage 157 can be implemented as a single cache that handles read and write events on a case by case basis, referred to as a flat cache. Alternately, or in addition, cache storage 157 can be implemented to have separate read and write caches, or an extra buffer cache that operates as a read/write cache.

Cache storage 157 can be implemented as external memory to system 150, or can be internal. In addition, cache storage 157 can be implemented as non-volatile memory, battery backed RAM or flash memory. Indeed, cache storage 157 can be implemented as combinations of these types of memories, as well as other types of memories, with different caching policies associated with each type of memory. Cache filter 155 can also cause additional or less memory to be allocated for cache storage 157, the memory being selected from any available type.

Cache filter 155 maintains cache coherence in dependence upon the configuration of cache storage 157, based on the cache policies provided in cache filter 155. For example, if cache storage 157 comprises a read cache and a write cache, any competing requests for reading and writing a given data item is resolved by permitting the write to the cache to occur first. Cache filter 155 also causes cache storage 157 to be committed to an associated mass storage, such as may be implemented in file system 156, based on populating cache storage 157 to a give threshold. For example, if cache storage 157 becomes 80% full, the entire contents of cache storage 157 are then committed to file system 156. As part of the determination of when to commit cache storage 157, a flag for a given cacheable object is used to indicate if the object is dirty. The cacheable object itself may be a block, a file, metadata, an inode, a directory or other components of file system 156 that can be cached. Cache contents can also be marked with a timestamp or serial number to indicate dirty data.

As discussed above, cache filter 155 implements and applies cache policies based on cache policy definitions. The policy can cause various parameters of the cache operations to be manipulated. For example, cache attributes of size and timeout for commitment to disk can be changed. Manipulation of cache attributes can be derived from cache hit rates, miss rates or hit ratio to monitor the impact of changing the attributes. The cache policy definitions can use parameters associated with an access request, such as, for example, the process originating the request, a user, a client computer application, a time associated with the request or a workload indication or stipulation. For example, a larger cache may be allocated for heavy workload conditions, and may be scheduled in advance using the cache policy and cache policy definitions.

One application for the caching system implemented under a filter model through a filter framework is a "lazy" application related to data access. For example, compression of data in accordance with a compression algorithm is a task that can be completed with a write cache having low priority. As another example, encryption of data may be implemented with a write cache having low priority, so that the resulting encrypted data is stored in file system 156. In this way, the write cache can assist with the workload of the typically processing intensive encryption operation, to help relieve file system 156 of some workload to contribute to improving performance while maintaining security for encrypted data. Another application in which the disclosed caching system attains advantages over prior systems is replication of data across machines or networks.

In general, cache filter 155 can be located, or hooked, in a data path at a variety of points. Filter framework 154 has the ability to intercept data transmissions at multiple points in one or more data paths to permit cache filter 155 to operate on data having potentially different characteristics depending on where the data is intercepted. In addition, cache storage 157 may be implemented at one or more locations in a data storage and retrieval system. For example, cache storage 157 may be implemented in a local CPU coupled to an internal memory bus. Cache storage 157 may be implemented in conjunction with network addressed DMA, for example. The modularity of cache filter 155 and cache storage 157 permits a variety of different configurations for caching data in data storage system 150.

An exemplary embodiment of the disclosed system and method provides a facility for multiple instances of a cache filter. For example, multiple filters may be loaded into filter framework 154, each cache filter having different criteria or different tasks. Alternately, or in addition, a cache filter 155 can be implemented to have cascading dynamic caches. For example, caches may be created or deleted based on various criteria provided in cache filter 155. Such criteria may include the formation of one or more dynamic caches based on a peak workload or high priority applications or tasks. The caches can be independent, or can share access requests, to help distribute available resources. Cache filters or dynamic caches may also be dedicated to specific purposes, such as handling security for file system 156 or holding directory structures for file system 156.

In another exemplary embodiment, caching definitions 136 can be replicated across a number of data storage nodes, which may be remotely located in a metropolitan area, for example. Caching definitions and cache controllers can be made to be persistent in the case of a file system crash, so that the caching definitions and state of a cache controller can be restored when a volume is mounted after a crash, for example. Similarly, dynamic caches may also be defined to persist in nonvolatile or battery-backed memory, or can be backed up in a persistent image that can be restored in the event of a crash.

In another exemplary embodiment, caching definitions can be enabled or disabled, either manually or in accordance with various preset criteria, to permit dynamic caching to effectively be turned on or off for various events or criteria related to data access. The settings for the caching definitions, and the content of the caching definitions themselves can be configured with a user interface that provides access to a dynamic cache module that is pluggable in a data path, or a cache filter that can be reconfigured in a data storage and retrieval system.

The operations herein described are purely exemplary and imply no particular order. Further, the operations can be used in any sequence when appropriate and can be partially used. With the above embodiments in mind, it should be understood that the invention can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosed system and method can also be embodied as computer readable code on a computer readable medium. The computer readable medium is any data storage device that can store data, which can be thereafter be read by a computer system. Examples of the computer readable medium include hard drives accessible via network attached storage (NAS), Storage Area Networks (SAN), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. The computer readable medium can also be distributed using a switching fabric, such as used in computer server farms.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A dynamic cache system for use with a data storage system having a data access interface and a storage device with a data path therebetween, the dynamic cache system comprising:
   a cache controller coupled to the data path between the storage device and the data access interface, the cache controller registering to be called by a filter framework in response to an I/O operation on the data path between the data access interface and the data storage device to control caching of data accessed through the I/O operation;
   a storage memory accessible by the cache controller and configurable by the cache controller to be an intermediate storage for the data accessed through the I/O operation on the data path under control of the cache controller; and
   a caching definition accessible by the cache controller having a predetermined criteria for prompting caching activity by the cache controller, the cache controller being responsive to the predetermined criteria to provide selective caching of the data in the storage memory such that the data associated with the I/O operation is cached or prevented from being cached based on the predetermined criteria.

2. The dynamic cache system according to claim 1, further comprising a plurality of caches configured in the storage memory by the cache controller and under control of the cache controller.

3. The dynamic cache system according to claim 2, wherein at least one of the plurality of caches further comprises a read cache or a write cache.

4. The dynamic cache system according to claim 1, wherein the cache controller can allocate and deallocate a cache in the storage memory.

5. The dynamic cache system according to claim 1, further comprising:
   a file system implemented in conjunction with the data storage system; and
   the predetermined criteria identifies file based parameters in the I/O operation.

6. The dynamic cache system according to claim 1, further comprising:
   a logical unit defined in the data storage system accessible for block based I/O operations from the data access interface; and
   the predetermined criteria identifies parameters in the block based I/O operation.

7. The dynamic cache system according to claim 1, wherein the predetermined criteria further comprises one or more of a user ID, an application ID, a process ID or a thread ID.

8. The dynamic cache system according to claim 1, wherein the storage memory is remotely located from the cache controller.

9. The dynamic cache system according to claim 1, wherein the cache controller is configured as a filter operable with the filter framework coupled to the data path.

10. The dynamic cache system according to claim 1, further comprising:
    the filter framework coupled to the data path in the data storage system for managing filter functions; and
    the dynamic cache system being implemented as a filter operable within the filter framework for caching I/O data.

11. The dynamic cache system according to claim 1, wherein the predetermined criteria further comprises one or more of a client source identifier, user credential, file directory, volume name, file offset, time of day, I/O groupings, I/O sequence or process credentials.

12. A method for implementing a dynamic cache system for use with a data storage system having a data access interface and a storage device with a data path therebetween, the method comprising:
    configuring a storage memory to be an intermediate storage for data accessed through an I/O operation occurring on the data path between the data access interface and the storage device;
    registering to be called by a filter framework in response to the I/O operation being intercepted on the data path between the data access interface and the data storage device;
    identifying a parameter within the I/O operation to contribute to determining a caching behavior for the data associated with the I/O operation;
    consulting a caching definition determining a caching action for the data to cause or prevent caching of the data based at least in part on a value of the identified parameter; and
    caching the data in accordance with the caching action.

13. The method according to claim 12, wherein configuring the storage further comprises allocating a plurality of caches.

14. The method according to claim 13, further comprising implementing at least one cache as a read cache or as a write cache.

15. The method according to claim 12, wherein configuring the storage further comprises allocating or deallocating a cache in the storage memory.

16. The method according 12, further comprising:
    implementing a file system in conjunction with the data storage system; and
    identifying a file based parameter within the I/O operation.

17. The method according to claim 12, further comprising:
defining a block based logical unit in the data storage system;
performing a block based I/O operation on the logical unit; and
identifying a block based parameter within the I/O operation.

18. The method according to claim 12, wherein the caching definition further comprises one or more of a user ID, an application ID, a process ID or a thread ID.

19. The method according to claim 12, further comprising arranging the memory storage at a remote location from the data storage system.

20. The method according to claim 12, further comprising implementing the cache definition in a filter operable with the filter framework implemented in the data storage system.

21. The method according to claim 12, further comprising implementing the filter framework in the data storage system for managing filter framework in the data storage system for managing filter functions; and
implementing the dynamic cache system as a filter operable within the filter framework for caching I/O data.

22. The method according to claim 12, further comprising providing one or more of a client source identifier, user credential, file directory, volume name, file offset, time of day, I/O groupings, I/O sequence or process credentials in the caching definition.

23. A data storage and retrieval system having a filter framework operable to provide filtering functions, and a dynamic cache filter being operable with the filter framework and comprising:
a cache controller coupled to the filter framework and operable to send and receive information to and from the filter framework, the cache controller registering to be called by the filter framework based on an I/O operation intercepted by the filter framework to control caching of data accessed through the I/O operation;
a cache memory coupled to the cache controller and configured to be an intermediate storage for the data associated with the I/O under control of the cache controller; and
a caching definition in the cache controller being configured to influence the cache controller to implement caching of the data in accordance with a predetermined criteria such that the data associated with the I/O operation is cached or prevented from being cached based on a parameter associated with the I/O operation in combination with the predetermined criteria.

24. The data storage and retrieval system according to claim 23, further comprising:
a logical unit as a collection of blocks and accessible through a block based I/O operation; and
the caching definition comprises a parameter of the block based I/O operation.

25. The data storage and retrieval system according to claim 23, wherein the parameter comprises one or more of a user ID, application, process, thread, client source identifier, user credential, file directory, volume name, file offset, time of day, I/O grouping, I/O sequence or process credentials.

* * * * *